United States Patent
Zhang et al.

(10) Patent No.: US 7,813,907 B2
(45) Date of Patent: Oct. 12, 2010

(54) HYBRID METHOD FOR ENFORCING CURVATURE RELATED BOUNDARY CONDITIONS IN SOLVING ONE-PHASE FLUID FLOW OVER A DEFORMABLE DOMAIN

(75) Inventors: Jie Zhang, Santa Clara, CA (US); Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 622 days.

(21) Appl. No.: 11/777,076

(22) Filed: Jul. 12, 2007

(65) Prior Publication Data

US 2009/0018807 A1    Jan. 15, 2009

(51) Int. Cl.
*G06G 7/50* (2006.01)
(52) U.S. Cl. .......................................... 703/9
(58) Field of Classification Search .................. 703/9
See application file for complete search history.

(56) References Cited

U.S. PATENT DOCUMENTS

| | | | |
|---|---|---|---|
| 6,271,856 | B1 | 8/2001 | Krishnamurthy |
| 6,574,650 | B1 | 6/2003 | Aoki |
| 6,810,370 | B1 | 10/2004 | Watts, III |
| 6,906,458 | B2 | 6/2005 | Kobayashi |
| 7,006,088 | B1 | 2/2006 | Guskov et al. |
| 7,085,695 | B2 | 8/2006 | Yu et al. |
| 7,117,138 | B2 | 10/2006 | Yu et al. |
| 2002/0046014 | A1 | 4/2002 | Kennon |
| 2004/0181383 | A1 | 9/2004 | Yu et al. |
| 2004/0181384 | A1 | 9/2004 | Yu |
| 2005/0243117 | A1 | 11/2005 | Yu |
| 2006/0000081 | A1 | 1/2006 | Kondo |
| 2006/0044506 | A1 | 3/2006 | Kida et al. |
| 2006/0070434 | A1* | 4/2006 | Yu .............................. 73/152.18 |
| 2007/0051958 | A1 | 3/2007 | Yamazaki et al. |

(Continued)

FOREIGN PATENT DOCUMENTS

EP    0980048 B1    10/2003

(Continued)

OTHER PUBLICATIONS

Di, et al., "Level Set Calculations for Incompressible Two-Phase Flows on a Dynamically Adaptive Grid", Oct. 10, 2006, pp. 1-24.

(Continued)

*Primary Examiner*—David Silver

(57) ABSTRACT

An embodiment of the present invention may be a system or method for simulating the flow of a single-phase fluid flow. Markers represent a moving fluid boundary of the single-phase fluid at a first point in time. The moving fluid boundary separates a simulation space into a fluid space and a non-fluid space. The single-phase fluid inhabits the fluid space. A signed distance function is evaluated at points surrounding the moving fluid boundary based upon markers. The curvature of the moving fluid boundary based on the signed distance function is evaluated near the markers in the non-fluid space. The curvature is not evaluated at the moving fluid boundary. The velocity of the fluid is calculated based upon the curvature of the level set in the non-fluid space. Update the position of the moving fluid boundary at a second point in time based on the velocity of the fluid.

9 Claims, 7 Drawing Sheets

U.S. PATENT DOCUMENTS

| | | | |
|---|---|---|---|
| 2007/0073527 | A1 | 3/2007 | Flandrin et al. |
| 2007/0109606 | A1 | 5/2007 | Nagae |
| 2007/0136042 | A1 | 6/2007 | Yu |

FOREIGN PATENT DOCUMENTS

| | | |
|---|---|---|
| JP | 2003-186918 | 7/2003 |
| JP | 2006-318481 | 11/2006 |

OTHER PUBLICATIONS

Deegan, Robert D., et al., "Contact Line Deposits in an Evaporating Drop", Physical Review E, 62(1):756-765, Jul. 2000, The American Physical Society, College Park, MD.

Deegan, Robert D., et al., "Capillary Flow as the Cause of Ring Stains from Dried Liquid Drops", Nature, 389(23):827-829, Oct. 1997, Nature Publishing Group, London, United Kingdom.

Deegan, Robert D., "Pattern Formation in Drying Drops", Physical Review E, 61(1):475-485, Jan. 2000, The American Physical Society, College Park, MD.

Van Dam, Dirkjan B., "Layer Thickness Distribution of Thin-Film Ink-Jet Printed Structures", XXI International Congress of Theoretical and Applied Mechanics, Aug. 15-21, 2004, Warsaw, Poland.

Xu, Jun, et al., "Self-Assembly of Gradient Concentric Rings via Solvent Evaporation from a Capillary Bridge", Physical Review Letters, 96(06):066104, Feb. 17, 2006, The American Physical Society, College Park, MD.

Shepel, Sergey V., et al., "Implementation of a Level Set Interface Tracking Method in the FIDAP and CFX-4 Codes", Journal of Fluids Engineering, vol. 127(4):674-686, Jul. 2005, ASME International, New York, NY.

Yamaue, Tatsuya, et al., "The Modeling and Simulation of Dot Formation Kinetics in the Drying Process of Polymer Solution Drop", Proceedings of Third International Conference on Multiscale Materials Modeling, 953-956, Sep. 18, 2006, Fraunhofer Institute for Mechanics of Materials IWM, Freiburg, Germany.

Little, Jeffery K., "Simulation of Droplet Evaporation in Supercritical Environments Using Parallel Molecular Dynamics", Thesis, Aug. 1996, Pennsylvania State University, Department of Aerospace Engineering, University Park, PA.

Proceedings of MMM Third International Conference Multiscale Materials Modeling, Symposium 8 Multiscale Simulation Approaches for Static and Dynamic Properties of Macromolecular Materials, Sep. 18-22, 2006, pp. 921-927; 928-931; 953-956.

J. A. Sethian, "Level Set Methods and Fast Marching Methods," Cambridge University Press, New York, N.Y., 1999, p. 9.

G. Tryggvason, et al., "A Front Tracking Method for the Computations of Multiphase Flow", Feb. 2001, pp. 1-58.

Osher, S., et al., "Level Set Methods", Feb. 25, 2000, pp. 1-61.

Tryggvason, G., et al., "A Front-Tracking Method for the Computations of Multiphase Flow", Journal of Computational Physics 169, Jan. 5, 2001, pp. 708-759.

Osher, S., et al., "Fronts Propagating with Curvature Dependent Speed: Algorithms Based on Hamilton-Jacobi Formulations", Journal of Computational Physics, 79, pp. 12-49, 1988.

Osher, S., et al., "Level Set Methods: An Overview and Some Recent Results", Sep. 5, 2000, pp. 1-65.

* cited by examiner

HYBRID METHOD FOR ENFORCING CURVATURE RELATED BOUNDARY CONDITIONS IN SOLVING ONE-PHASE FLUID FLOW OVER A DEFORMABLE DOMAIN

BACKGROUND OF THE INVENTION

1. Field of the Invention

The present invention relates to systems and methods for simulating a single-phase fluid flow enclosed by a deformable boundary while enforcing curvature related boundary conditions.

2. Description of the Related Art

The present invention is directed towards the study of single-phase fluids. A single-phase fluid, as used in the present invention refers to a pure fluid or a mixture. A boundary encapsulates this single-phase fluid, over time the boundary may evolve and move through space. The solution domain is limited to an area delimited by the boundary. For the purposes of the present invention, the effect of an interface, if any that does form between elements of such a mixture may be ignored when considering the motion of the boundary.

Motion of the boundary may be governed by one or more governing equations. The boundary may be defined by a set of markers. For some systems the governing equations may include terms related to the curvature of the boundary. Prior art methods have calculated the curvature of the boundary from a cubic spline fitted to the markers that define the boundary. Small errors in the positions of the marker can cause errors in the second derivatives, which can create variations in the curvature. Under certain conditions, this variation may increase in magnitude as the boundary evolves in time. This can lead to numerically unstable simulations, which exhibit unrealistic oscillations. The present invention is directed towards minimizing this effect and creating numerically stable simulations.

Prior art methods have attempted to address the problems that arise from defining the boundary using markers by employing multi-phase fluid simulation methods (e.g., front tracking methods). Front tracking methods have not been developed for single-phase fluid flow because there is no fluid on the other side of the boundary thus creating a jump condition in the system variable and their derivatives.

Problems arise when handling the boundary between the two fluids. Each fluid is characterized by a set of system variables (i.e., density, viscosity, and pressure). A jump condition necessarily exists at the boundary. This jump condition is represented by a step wise change in the system variables. This jump condition results in a discontinuity in system variables and their derivatives at the boundary. This discontinuity can prevent numerical solutions from converging.

Prior art methods have attempted to address this issue by smoothing system variables that cross the boundary. Smoothing these variables brings its own problems. Another problem with prior art methods is inability to conserve mass. The present invention is an attempt to address these problems with the prior art.

SUMMARY OF THE INVENTION

An embodiment of the present invention may be a system or method for simulating the flow of single-phase fluid flow. Markers represent a moving fluid boundary of the single-phase fluid at a first point in time. The moving fluid boundary separates a simulation space into a fluid space and a non-fluid space. The single-phase fluid inhabits the fluid space. A signed distance function is evaluated at points surrounding the moving fluid boundary based upon markers. The curvature of the boundary based on the signed distance function is evaluated near the markers in the non-fluid space. The curvature is not evaluated at the moving fluid boundary. The velocity of the fluid is calculated based upon the curvature of the level set in the non-fluid space. Update the position of the moving fluid boundary at a second point in time based on the velocity of the fluid.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

It can be challenging work to solve single-phase fluid flow problems in which the boundary conditions include time dependent deformable domains (e.g., a moving surface). Generally, only a few specific cases with a time dependent domain can be solved analytically. Most of the solutions to such problems can only be obtained through numerical methods.

Since the boundary of the domain is evolving with time, it is part of the time dependent solution that needs to be solved. This adds a further complexity to the numerical solution. The boundary conditions of such a problem may involve curvature related terms. How to treat these boundary conditions correctly in the numerical algorithm directly affects the accuracy and numerical stability of the numerical solution.

Figure 1:
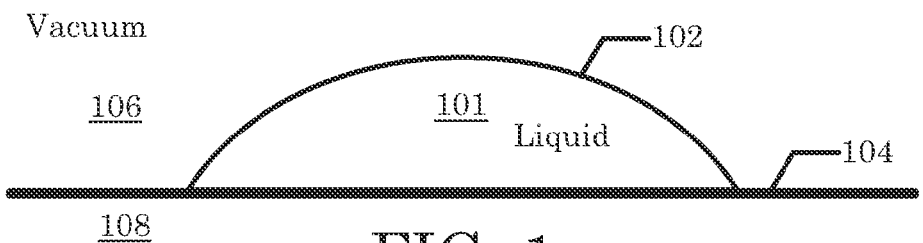
FIG. 1 illustrates a liquid drop on a substrate which the present invention can be used to simulate.

The present invention is a new hybrid method for enforcing curvature related boundary conditions when solving single-phase fluid flow problems. An example of such a single-phase fluid problem is shown in FIG. 1. A liquid 101 forms a drop on a substrate 108 in a vacuum 106. The simulation boundary consists of a fixed boundary 104 and a deformable boundary 102. The fixed boundary 104 separates the liquid 101 from the substrate 108 while deformable boundary 102 separates the liquid 101 from the vacuum 106. In the present invention, the deformable boundary 102 of the domain is represented by a set of markers. Compared with the prior art, the present invention preserves the shape of the boundary 102 and suppresses accumulated errors caused by small local variations in the positions of the markers.

A numerical procedure for solving single-phase incompressible fluid 101 problems with a deformable boundary 102 (i.e. time dependent deformable solution domain) may use markers to track the boundary. The numerical procedure may include deriving indicator functions defined on a grid to solve for a velocity field, a pressure field, and the markers. The numerical procedure may also include deforming the boundary 102 if there are velocity boundary conditions on the boundary or for other reasons. The numerical procedure may also include using a projection method to solve a set of flow equations given a particular location of the deformable boundary 102.

Solving the flow equations may include solving momentum equations to obtain an intermediate velocity field. The intermediate velocity field may be extrapolated to grid locations near but outside the deformable boundary. The Poisson equation (1)

$$\nabla^2 p = \frac{\rho}{\Delta t} \nabla \cdot \vec{u}^*$$

$$\vec{u}^* = \left(1 + \frac{\Delta t}{\rho}\mu\nabla^2\right)\vec{u}$$

(1)

may be solved for the pressure of the fluid 101 while enforcing an incompressibility condition of the fluid 101 and a boundary condition that is at least partially in motion. In equation (1) p is the pressure, $\rho$ is the density, $\Delta t$ is the time step, and $\vec{u}^*$ is the intermediate velocity vector. Also in equation (1) $\vec{u}$ is the velocity vector and $\mu$ is the viscosity of the fluid 101, As the boundary 102 deforms so do the markers. The markers may bunch up or spread out depending on the non-uniformity of the motion associated with the boundary 102. New markers may be generated to keep the distance between markers within a given range (e.g. 0.2-0.8 times the cell size) or depending on the curvature of the boundary 102. The new marker positions may be used in the next time step.

The boundary 102, which is in motion, is represented explicitly by markers, which sit on the surface of the boundary 102. These markers are not tied to a specific point in space, instead they move with the boundary 102 as the boundary 102 is moved by the local velocity of the fluid 101, so do the markers.

The position of the boundary 102 is tracked explicitly in the time domain thus placing the present invention in the category of "front tracking" fluid flow simulation methods. Which should be distinguished from "front capturing" methods, such as the level set approach, in which the boundary is implied by the zero value contour of a level set function. Prior art methods have used front tracking methods to solve multi-phase fluid flow problems. In the past, front tracking methods have not been used to solve single-phase fluid flow problems. Front tracking methods were not used because a methodology did not exist to effectively enforce the boundary conditions. Whereas, front capturing methods have problems conserving the mass of the fluid. The present invention is much better at conserving the mass of the fluid than front capturing methods.

The present invention aims to address this drawback of the front tracking method when applied to single-phase problems.

Along the boundary 102, curvature related boundary conditions often play an important role in determining local velocities of the fluid 101. For example, when attempting to calculate the flow of a fluid 101, the stress the fluid 101 experiences at the boundary 102 must meet certain conditions. An example of such a condition may include balancing the normal stress using the following equation (2).

$$[p - n_i \tau_{ij} n_j] = \sigma\kappa \quad (2)$$

In equation (2) the quantities in the square brackets [ ] represent a jump condition across the moving boundary 102. The symbol p is representative of the pressure, the symbol $\tau_{ij}$ is representative of the stress tensor, the symbols $n_i$ and $n_j$ are representative of the normal vector at the surface, $\sigma$ is the surface tension coefficient of the fluid 101, and $\kappa$ is the local surface curvature. Enforcing curvature related boundary conditions can cause instabilities to occur in a numerical method because the curvature is related to the second derivative of the positions of the markers. In the prior art the curvature had been calculated based on the second derivative of a line fitted to the markers.

In order to simplify the following discussion of the hybrid method, the stress term in equation (2) is ignored in the following discussion. Hence, the boundary condition becomes equation (3).

$$[P] = \sigma\kappa \quad (3)$$

An individual skilled in the art would appreciate that the stress term from equation (2) may be included in the present invention without going beyond the spirit and scope of the present invention as recited in the claims.

Figure 2:
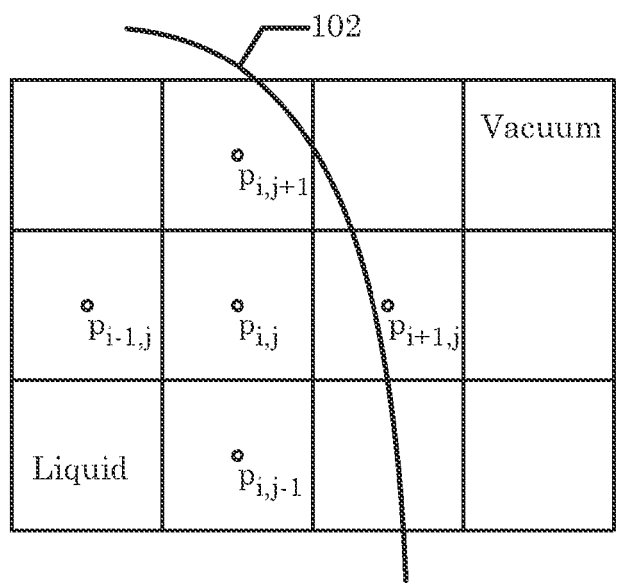
FIG. 2 illustrates a grid of computational cells in which the pressure is evaluated at the center of each computational cell, a solution domain that passes through the cells and a discrete pressure jump condition that occurs at the boundary.

When we solve the discrete Poisson equation for the pressure p, the pressure p may be evaluated at the center of the computational cell as shown in FIG. 2. When the pressure is located outside the domain enclosed by the surface, the present invention, may determine the pressure using the boundary condition, equation (3).

As illustrated in FIG. 2 in two spatial dimensions, a discretized Poisson equation (4)

$$\frac{\frac{p^n_{i+1,j} - p^n_{i,j}}{\Delta x} - \frac{p^n_{i,j} - p^n_{i-1,j}}{\Delta x}}{\Delta x} + \frac{\frac{p^n_{i,j+1} - p^n_{i,j}}{\Delta y} - \frac{p^n_{i,j} - p^n_{i,j-1}}{\Delta y}}{\Delta y} =$$

$$\frac{\rho}{\Delta t}\left(\frac{(u^n_{i+1,j})^* - (u^n_{i,j})^*}{\Delta x} + \frac{(v^n_{i,j+1})^* - (v^n_{i,j})^*}{\Delta y}\right)$$

(4)

is evaluated near a boundary 102. Equation (4) is the discretized Poisson equation evaluated at a specific grid point (i, j) at a time step n. In which $\Delta x$ and $\Delta y$ are the grid spacing, u* and v* are the intermediate velocities in the x and y directions and $\Delta t$ is the time step.

When evaluating equation (4) near a solution domain boundary some pressure values may be undefined. As shown in FIG. 2 $p_{i+1,j}$ is outside the solution space and is undefined. Equation (3) may be used to evaluate this undefined pressure. In which case, $p_{i+1,j} = p_0 + \sigma\kappa$ wherein $p_0$ is the pressure outside the solution domain (or boundary 102). The discretized Poisson equation (4) becomes equation (5)

$$\frac{\frac{p_0 + \sigma \kappa_{i+1,j}^n - p_{i,j}^n}{\Delta x} - \frac{p_{i,j}^n - p_{i-1,j}^n}{\Delta x}}{\Delta x} + \frac{\frac{p_{i,j+1}^n - p_{i,j}^n}{\Delta y} - \frac{p_{i,j}^n - p_{i,j-1}^n}{\Delta y}}{\Delta y} = \frac{\rho}{\Delta t}\left(\frac{(u_{i+1,j}^n)^* - (u_{i,j}^n)^*}{\Delta x} + \frac{(v_{i,j+1}^n)^* - (v_{i,j}^n)^*}{\Delta y}\right) \quad (5)$$

In equation (5) the unknown pressure has been replaced with the surface tension coefficient and the local surface curvature. If more than one of the neighboring locations is outside the solution boundary than we apply the same procedure as described above. Note that this is only a first order approximation for the jump condition. Higher order approximations are possible. Prior art methods have evaluated the local surface curvature by fitting a curve to the local boundary. In the present invention, the local surface curvature is evaluated using a signed distance function $\phi$.

The local curvature is a measure of the deviation of the fluid boundary 102 from a straight line. Given a boundary 102, there is a normal vector $\vec{n}$ on the boundary 102 that is perpendicular to the boundary. To measure the deviation of the boundary one can take the differential of the normal vector $\vec{\nabla} \cdot \vec{n}$ along the boundary 102.

Marker positions are used to represent the boundary 102. These marker positions are also used to generate a signed distance function $\phi$. The signed distance function $\phi$ may be evaluated over the whole domain or over a narrow band around the boundary 102. The signed distance function may be virtually extended into the region of space on both sides of the fixed boundary 104. Two markers which represent the boundary 102 closest to the fixed boundary 104 may be used to linearly extend the boundary 102 and create a virtual boundary 104 Instead of using the marker positions to generate the normal vector, the signed distance function may be used as in equation (6)

$$\vec{n} = \frac{\vec{\nabla}\phi}{|\vec{\nabla}\phi|} \quad (6)$$

The curvature may then be calculated using equation (7)

$$\kappa = \vec{\nabla} \cdot \frac{\vec{\nabla}\phi}{|\vec{\nabla}\phi|} \quad (7)$$

which describes the relationship between the local curvature $\kappa$ and the signed distance function $\phi$. In a two dimensional Cartesian coordinate system this may be reduced to equation (8).

$$\kappa = \frac{\phi_{xx}\phi_y^2 - 2\phi_x\phi_y\phi_{xy} + \phi_{yy}\phi_x^2}{(\phi_x^2 + \phi_y^2)^{3/2}} \quad (8)$$

An individual skilled in the art will appreciate that this may be expanded to three dimensions or other coordinate systems without going beyond the scope of the present invention as recited in the claims.

Equation (8) can be used to calculate a curvature value $\kappa_{i,j}$ at the center of a computational cell. This may be done by approximating the derivatives of the signed distance function using the centered difference method. Other difference methods may be used without going beyond the scope of the invention. This curvature value $\kappa_{i,j}$ is an approximation of the averaged curvature of the fluid boundary in the cell or near the cell.

Figure 3A:
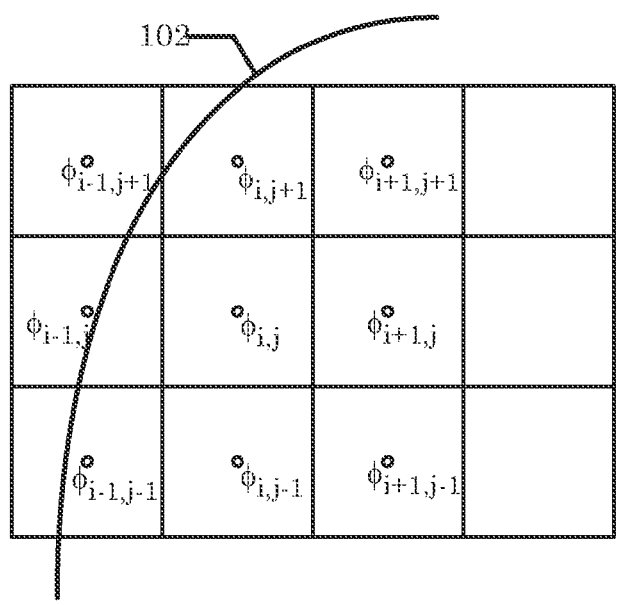
FIG. 3A illustrates the grid, the solution domain and level set values calculated at the center of computational cells.

FIG. 3A is an illustration of the discretized signed distance function $\phi_{i,j}$ along with the boundary 102. As shown in FIG. 3A the discretized signed distance function $\phi_{i,j}$ is evaluated at the cell centers.

Figure 3B:
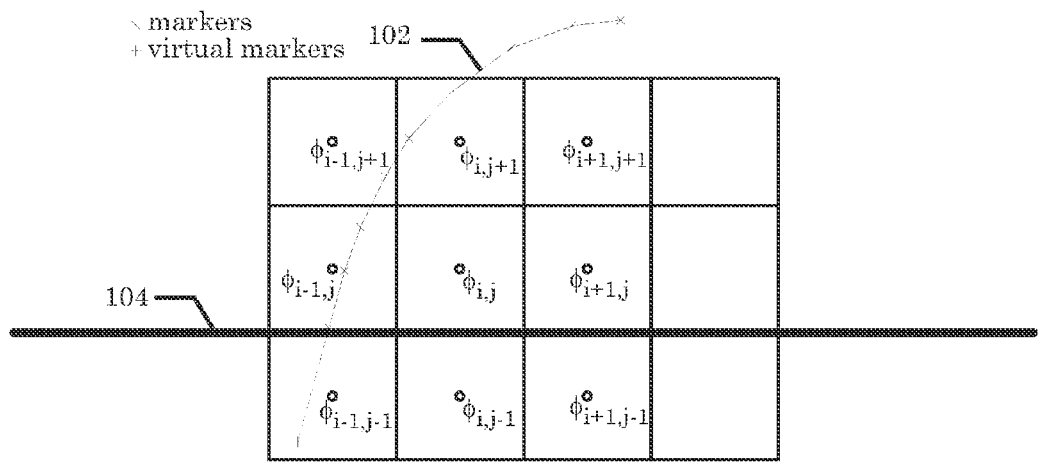
FIG. 3B illustrates the grid, the markers, the fixed boundary, the deformable boundary, and the virtual boundary.

FIG. 3B is an illustration of the boundary 102 represented by a series of markers. FIG. 3B also show virtual markers below the fixed boundary 104. The virtual markers are extended below the fixed boundary 104 by linearly extending the boundary 102 from the fluid side of boundary 104 to the non-fluid side of the boundary. Virtual level set values are calculated relative to the virtual markers. The virtual level set values are used to calculate the curvature using the equations below.

The centered difference method may be used to develop derivatives of the signed distance function as shown in equations (9)-(13).

$$\phi_{x_{i,j}} = \frac{\phi_{i+1,j} - \phi_{i-1,j}}{2(\Delta x)} \quad (9)$$

$$\phi_{y_{i,j}} = \frac{\phi_{i,j+1} - \phi_{i,j-1}}{2(\Delta y)} \quad (10)$$

$$\phi_{xx_{i,j}} = \frac{\phi_{i+1,j} - 2\phi_{i,j} + \phi_{i-1,j}}{(\Delta x)^2} \quad (11)$$

$$\phi_{yy_{i,j}} = \frac{\phi_{i,j+1} - 2\phi_{i,j} + \phi_{i,j-1}}{(\Delta y)^2} \quad (12)$$

$$\phi_{xy_{i,j}} = \frac{(\phi_{i+1,j+1} - \phi_{i-1,j+1}) - (\phi_{i+1,j-1} - \phi_{i-1,j-1})}{4(\Delta x)(\Delta y)} \quad (13)$$

The discretized version of equation (8) is equation (14) below.

$$\kappa_{i,j} = \frac{\phi_{xx_{i,j}}\phi_{y_{i,j}}^2 - 2\phi_{x_{i,j}}\phi_{y_{i,j}}\phi_{xy_{i,j}} + \phi_{yy_{i,j}}\phi_{x_{i,j}}^2}{(\phi_{x_{i,j}}^2 + \phi_{y_{i,j}}^2)^{3/2}} \quad (14)$$

Equation (14) may be used to calculate a curvature at the cell center based on the shape of the boundary near the cell center. In this way, even as the markers on the boundary move closer to each other as the boundary evolves, the curvature remains relatively smooth.

A Method for Implementing the Present Invention

Figure 4:
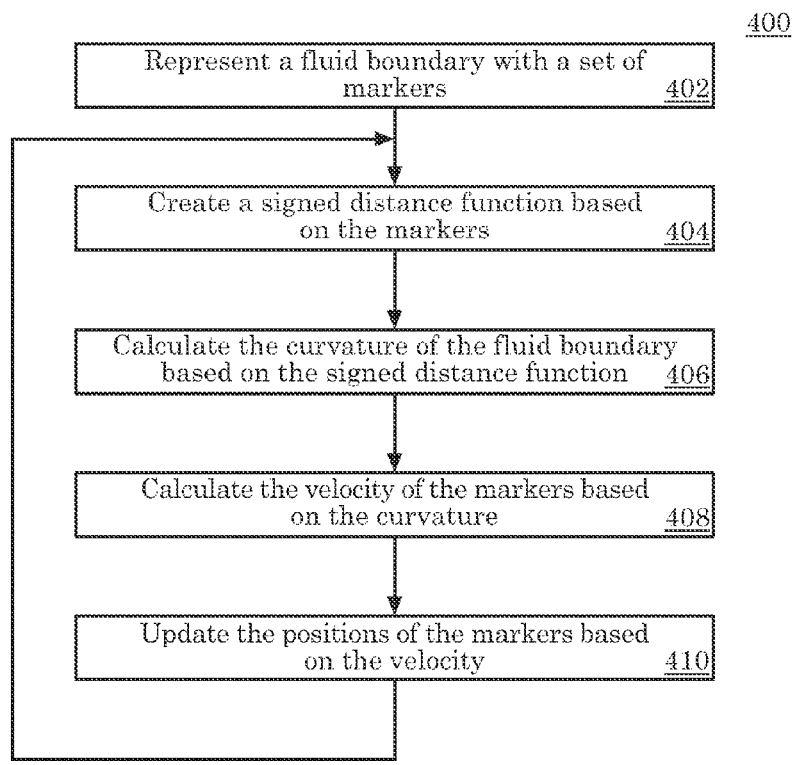
FIG. 4 is an overview of a method for performing the present invention.

FIG. 4 is an overview of a method 400 for implementing the present invention. This method 400 may be implemented in hardware, software or a combination of both. The method 400 is used to simulate the single-phase fluid 101 as illustrated in FIG. 1.

The single-phase fluid 101 forms at least one boundary 102 with its environment. This boundary 102 is movable. The single-phase fluid 101 may also form a second stationary boundary 104. The method includes a step 402 of describing the deformable boundary 102 with a set of markers. Each marker consists of a set of coordinates, which describe the position of a point on the boundary at a particular time. The coordinates may be in one, two, three, or more dimensions. The coordinate system may be Cartesian, polar, cylindrical or some other coordinate system.

The method 400 also includes creating a signed distance function during a step 404. The boundary 102 is an N−1 surface that moves through an N dimensional space. The boundary 102 divides the N dimensional space into two groups (a positive space and a negative space). The negative space may be the single-phase fluid 101 or the vacuum 106 or vice versa. The signed distance function may be a smooth continuous function, which is defined throughout the N dimensional space. The signed distance function has a positive value in the positive space and a negative value in the negative space. The signed distance function may be represented by a discrete number of points distributed in the N dimensional space. The absolute value of the signed distance function at a particular point in the N dimensional space is equal to the shortest distance from the particular point to the moving boundary 102 along a direction normal to the moving boundary 102, this statement is also true for all points in the N dimensional space.

The discrete number of points that represent the signed distance function may be distributed on a first grid. The first grid may coincide with portions of a second grid upon which values representative of the pressure of the liquid 101 are calculated. The first grid may cover only a portion of the N dimensional space. The first grid may be limited to grid cells, which are one, two, three, or four grid cells from the deformable boundary 102 based upon the order of the approximations used throughout the method 400.

The method 400 also includes estimating a local curvature of the boundary during a step 406. The local curvature of the boundary 104 may be an estimate of the intrinsic curvature or the extrinsic curvature (e.g., mean curvature or Gaussian curvature). The local curvature is estimated based upon the level set values calculated in the step 404.

If markers were used to describe the boundary, prior art methods would calculate the curvature of the boundary 102 on the boundary 102 directly from the markers. The present invention estimates a local curvature value at a gird point near the boundary 102. The local curvature is calculated on the non-liquid side of the boundary 102. The local curvature may be calculated only at grid cells that include the boundary 102. The local curvature may also be calculated at grid cells that are within one grid cell of the boundary 102. The local curvature is representative of the curvature of the boundary in and around the grid cell.

The method 400 also includes calculating the velocity of the fluid 101 near the boundary 102 in a step 408. The velocity of the fluid is calculated based upon the local curvature of the boundary as estimated on the non-liquid side of the boundary 102 and the pressure of the fluid 101 on the liquid side of the boundary 102.

The method 400 also includes updating the positions of the markers that define the boundary 102 in a step 410. The time step is advanced and the marker positions are updated based upon the velocity of the fluid 101 near the markers. The method then repeats itself until the simulation has ended.

Numerical Example

A numerical example of the present invention is used to illustrate the advantages of using our hybrid method of enforcing the boundary condition. Assume a liquid drop is attached at two endpoints to a substrate 108. The liquid is an incompressible fluid 101. Initially it assumes a circular shape. There is a small entrance flow at the bottom of the drop, which is described as a time independent parabolic profile flow. Since the Reynolds number is low, we are solving a creeping flow equation with the incompressibility condition enforced. The Stokes equation (15) and the incompressibility condition (16) may be considered the governing equations for this problem.

$$\rho \frac{\partial u}{\partial t} = -\nabla p + \mu \nabla^2 u \tag{15}$$

$$\nabla \cdot u = 0 \tag{16}$$

The liquid drop is in a vacuum 106. We assume that the pressure in vacuum 106 is zero. Hence, the boundary condition along the liquid-vacuum surface 102 is equation (3) discussed above. A projection method is utilized to solve the above equations. In this example, the surface tension coefficient $\sigma=1$; the mesh size is $\Delta x = \Delta y = 0.0025$; and the computational domain is 2(x) by 0.5 (y). The in-flow boundary conditions at the fixed boundary 104 are defined by equations (17):

$$\begin{cases} u = 0, \\ v = 0.1\left(x - 1 - \frac{\sqrt{3}}{4}\right)\left(x - 1 + \frac{\sqrt{3}}{4}\right), \quad 1 - \frac{\sqrt{3}}{4} \leq x \leq 1 + \frac{\sqrt{3}}{4} \end{cases} \tag{17}$$

The initial conditions for the liquid drop are an arc of a circle with a radius 0.5. The contact angle between the deformable boundary 102 and the fixed boundary 104 is initially $\theta = \pi/3$ relative to the fixed boundary. For this example, the points at which the deformable boundary 102 intersects the fixed boundary 104 are pinned, i.e. fixed in time.

Figure 5:
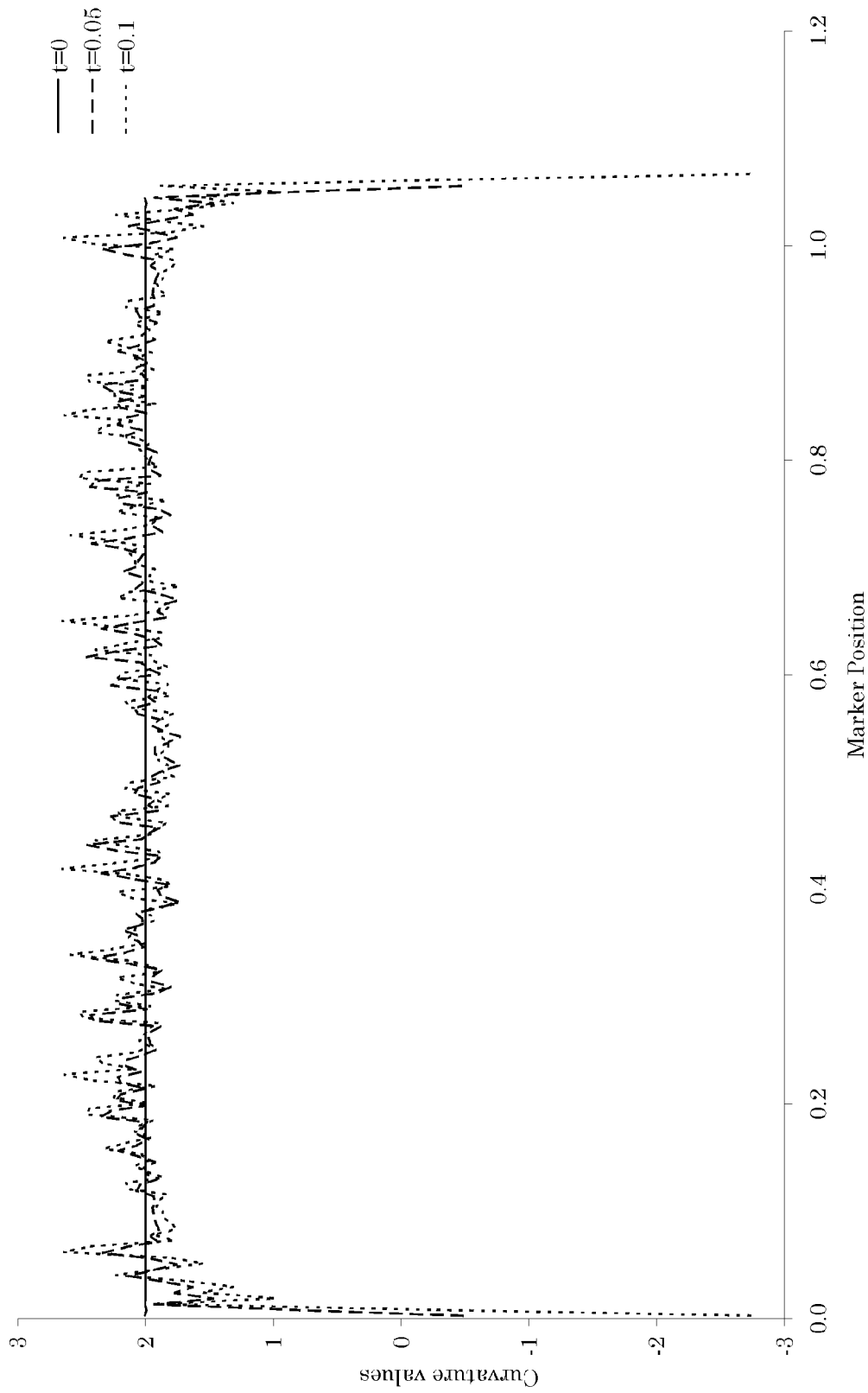
FIG. 5 illustrates curvature value results of a numerical method using the prior art method.

In the projection step the discrete Poisson equation is solved, we compare our method with a cubic spline fitting method. The liquid boundary 102 is defined by a set of markers. Prior art methods have used a cubic spline fitting method to calculate curvature values. FIG. 5 illustrates some numerical results using the prior art method. As shown in FIG. 5, as time evolves the curvature values are unstable. Under certain conditions, small variations in the marker positions can significantly alter the second derivative of the fitted curve, and cause variations in the curvature values as the solution evolves. As shown in FIG. 5 the magnitude of the variation increases over time, even becoming negative at the end points. This non-physical result does not mirror the reality of the system being simulated but is instead an artifact of the simulation method.

Figure 7:
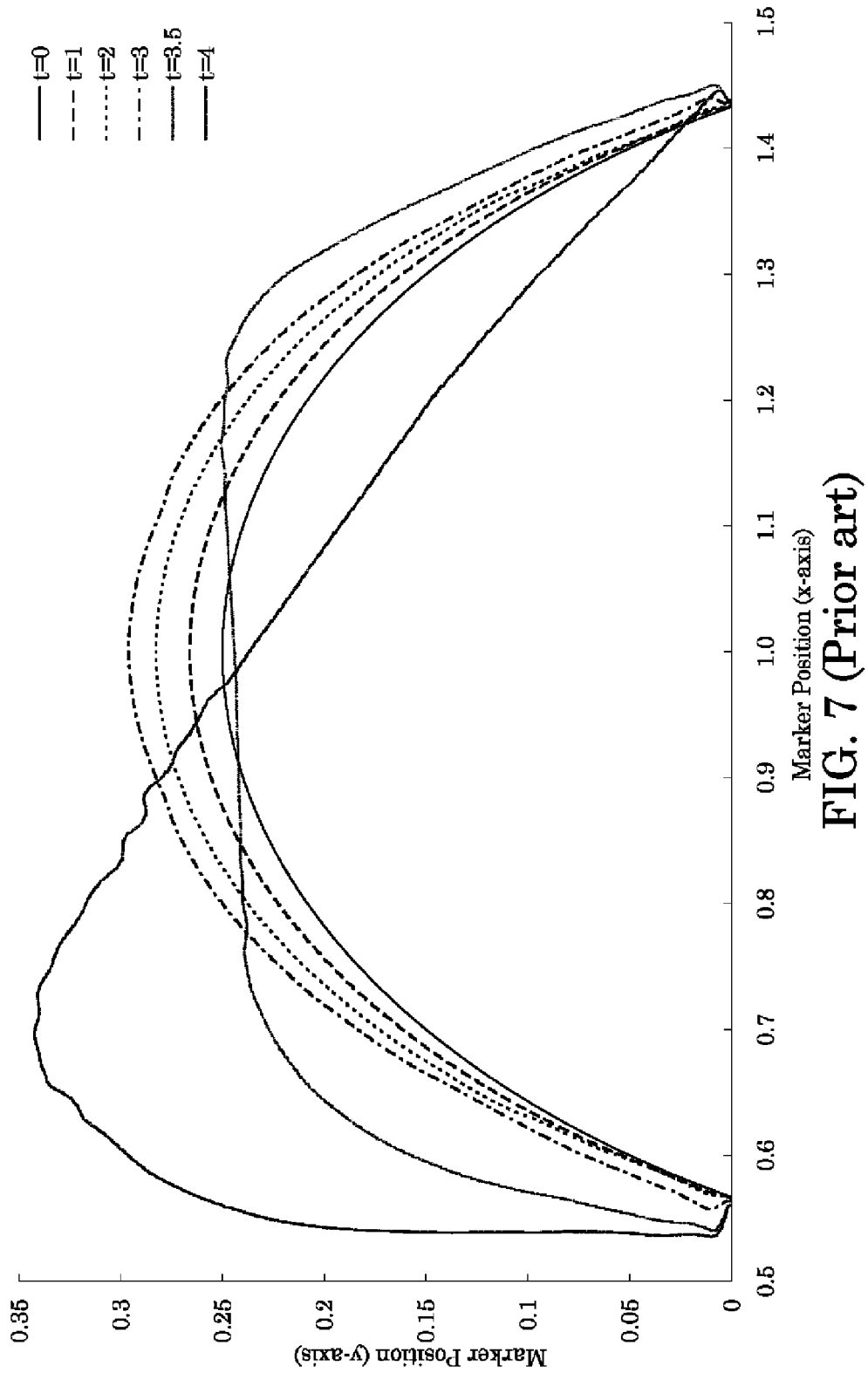
FIG. 7 illustrates boundary value results of a numerical method using the prior art method.

As time develops, the deformable boundary 102 will extend into the vacuum side 106 of the simulation. As time evolves, the markers tend to move closer to each other at the top of the deformable boundary 102. As discussed above, small local variations in the positions of the markers can have an exaggerated effect on the second derivative of the marker positions, which is reflected in the curvature. The curvature calculation based on the second derivative of the marker positions can be sensitive to any errors or noise in those positions. Instead of damping itself out, this noise can build on itself and run out of control. FIG. 7 is an illustration of such a situation. FIG. 7 illustrates the evolution of marker positions over time using the prior art method. As time evolves, the drop evolves in an asymmetric manner, which does not reflect the reality of the system being simulated which should evolve in a more symmetric manner.

Figure 6:
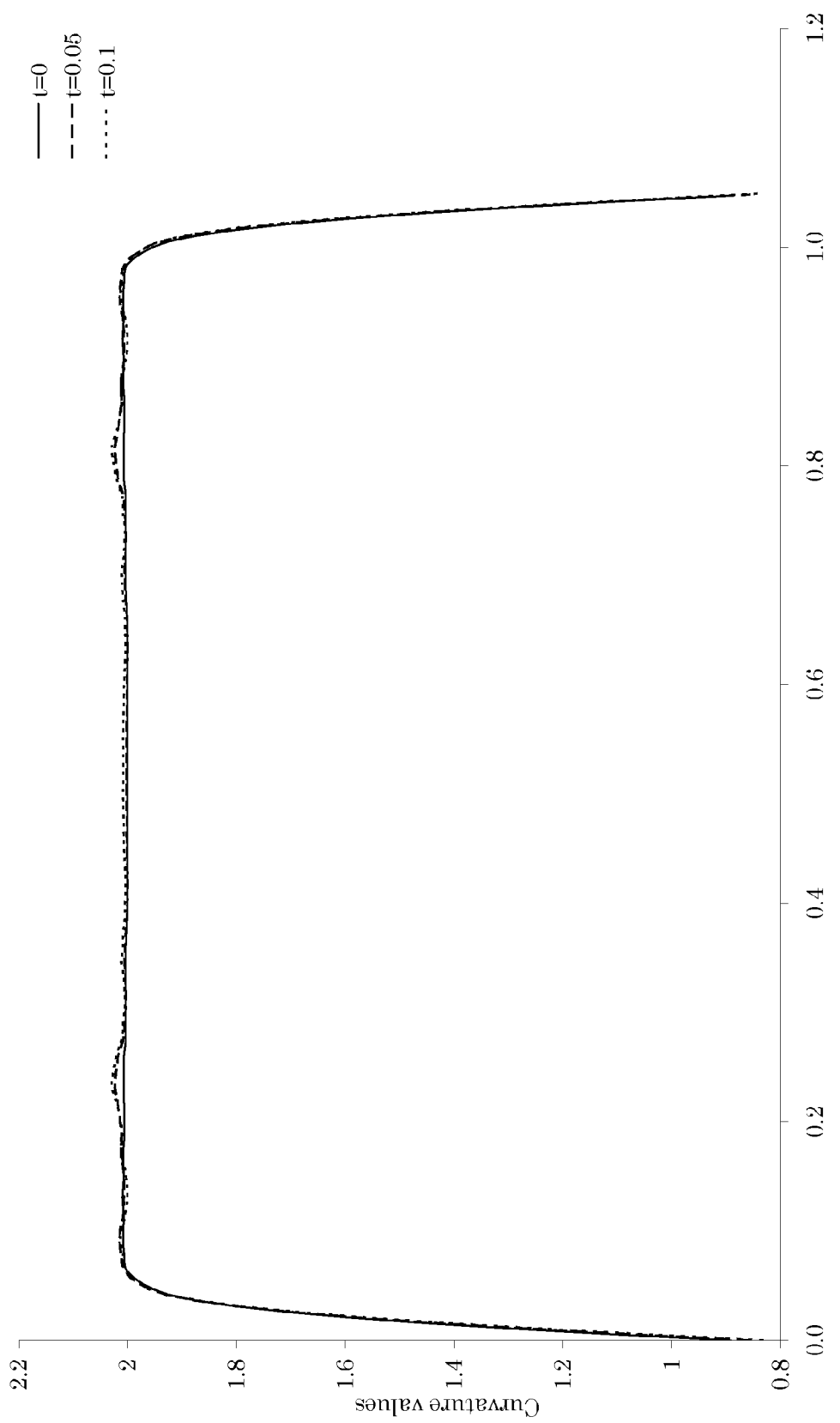
FIG. 6 illustrates curvature value results of a numerical method using the present invention.

FIG. 6 is an illustration of curvature values calculated using the present invention. As can be seen in FIG. 6 the variation in curvature values is much smaller than the results of the cubic-spline approach as shown in FIG. 5. The curvature values are smoother and the magnitude of the variation does not increase with time.

As shown in FIG. 6 near the end points of the fluid boundary 102 as the fluid boundary 102 meets the bottom boundary 104 on which the liquid drop is resting, the curvature decreases. This is a consequence of extending the level set below the bottom boundary 104. As described above, End segments of the fluid boundary 102 are extended in a linear fashion below the bottom fixed boundary 104 decreasing the curvature values at the end points.

Figure 8:
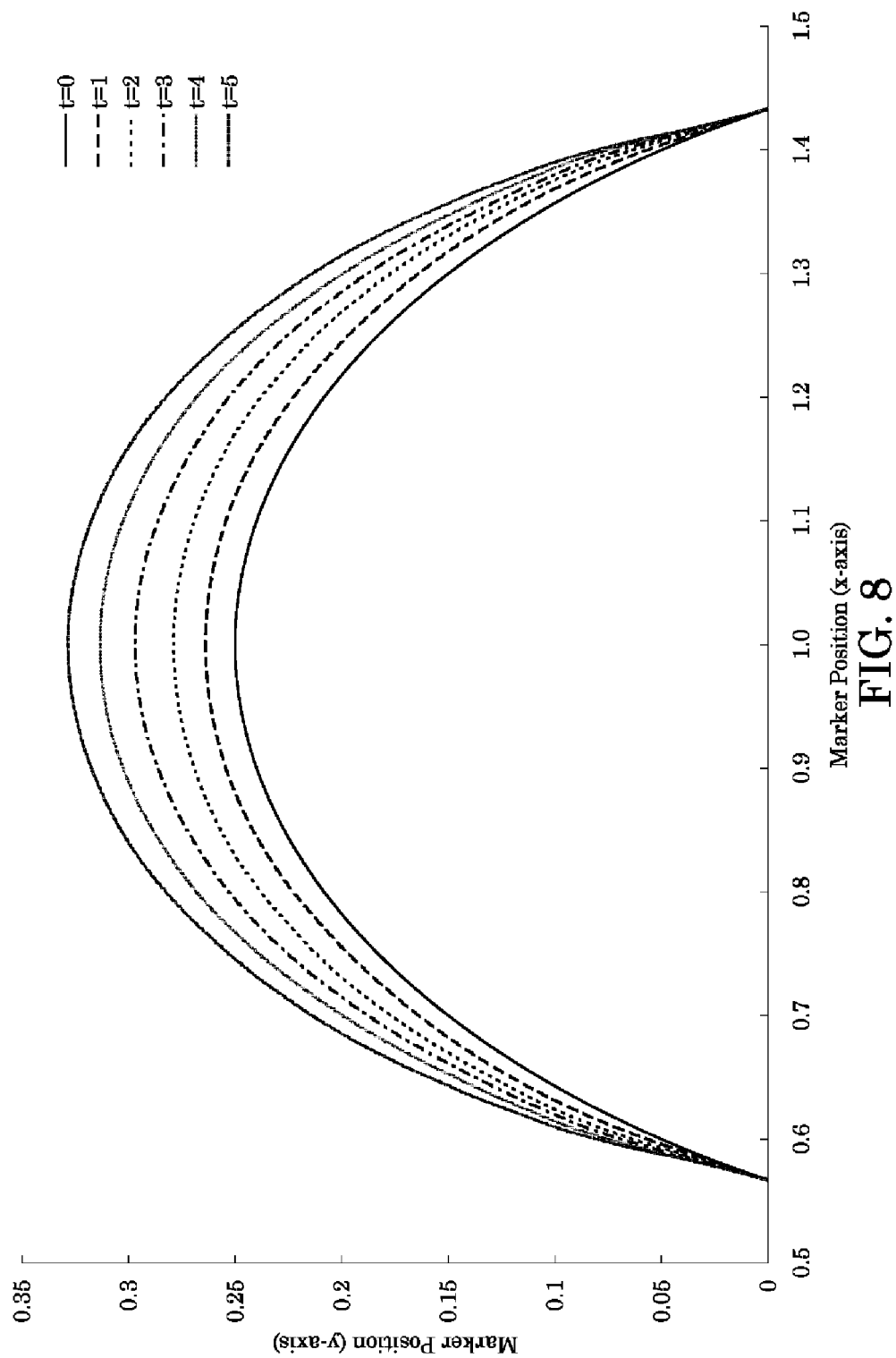
FIG. 8 illustrates boundary value results of a numerical method using the present invention.

FIG. 8 illustrates the evolution of the marker positions in time using the present invention. As shown in FIG. 8 the deformable boundary 102 keeps its round shape and symmetry. Compared to the prior art method shown in FIG. 7 the present invention simulates a drop that keeps its symmetry and is a closer reflection of the system being simulated.

System

Having described the details of the invention, an exemplary system 1000, which may be used to implement one or more aspects of the present invention will now be described with reference to FIG. 8. As illustrated in FIG. 8, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002 which may be in the form of random-access memory (RAM) and read-only memory (ROM).

Figure 9:
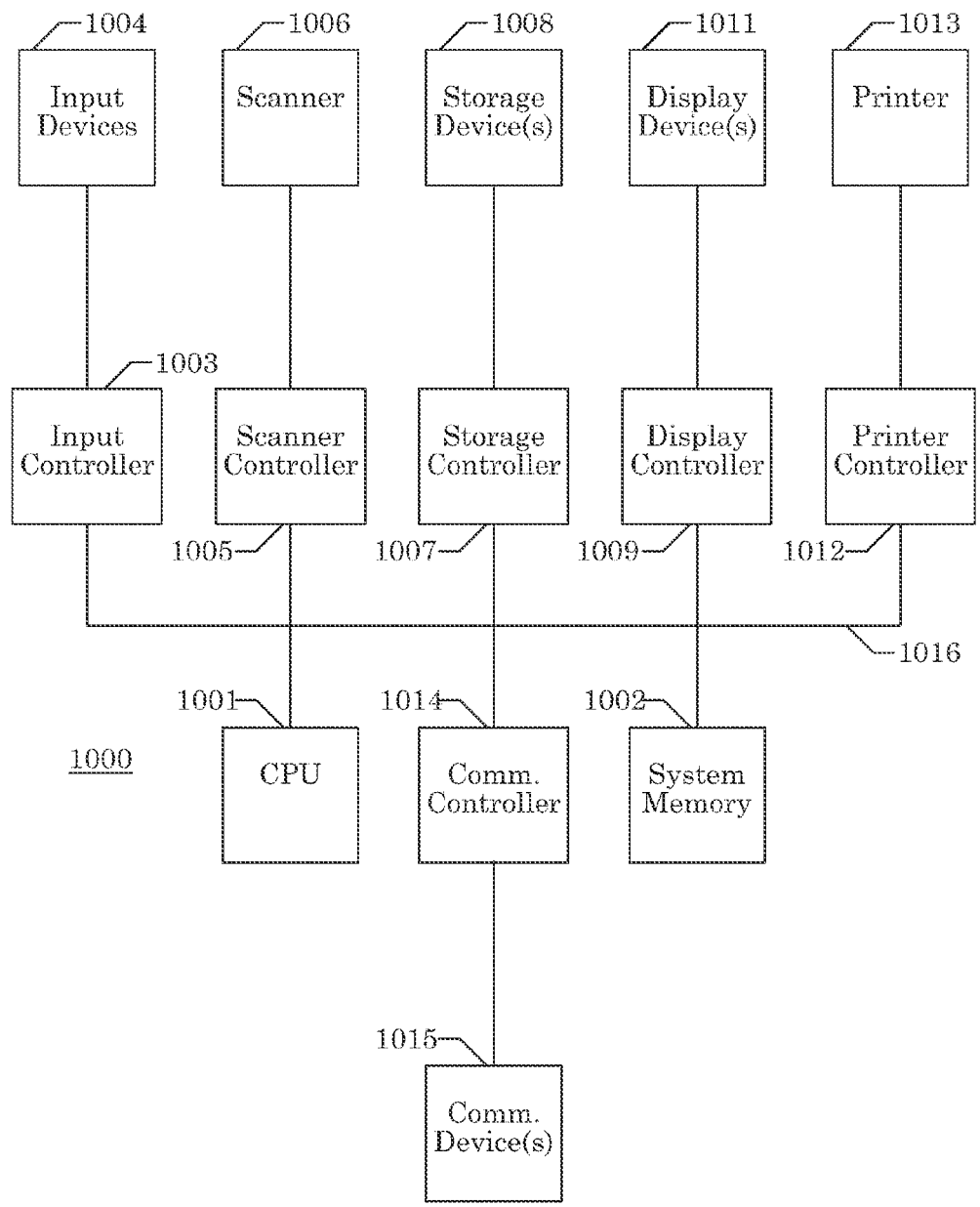
FIG. 9 illustrates a system on which the present invention may be implemented.

A number of controllers and peripheral devices may also be provided, as shown in FIG. 9. An input controller 1003 represents an interface to various input device(s) 1004, such as a keyboard, mouse or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "machine-readable medium" as used herein includes software, hardware having a program of instructions hardwired thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for simulating single-phase fluid flow comprising:
using a processor of a simulating system to perform the steps of:
representing a position of a moving fluid boundary at a first point in time with a plurality of fluid markers, wherein the moving fluid boundary provides a boundary for the single-phase fluid, the moving fluid boundary separates a simulation space into a fluid space and a non-fluid space, and the single-phase fluid inhabits the fluid space;
evaluating a plurality of signed distance function values at a first plurality of points surrounding the moving fluid boundary, based on the plurality of fluid markers;
evaluating a plurality of curvature values of the moving fluid boundary based on the signed distance function at a second plurality of points near the fluid markers, wherein the second plurality of points do not coincide with the position of the moving fluid boundary;

evaluating a plurality of velocity values at a third plurality of points in the fluid space of the single-phase fluid based upon the plurality of curvatures values; and representing the position of the moving fluid boundary at a second point in time by updating the positions of the fluid markers based on the plurality of velocity values;

wherein after the plurality of fluid markers are updated at a second point in time the positions of the plurality of fluid markers are recalculated, while substantially maintaining the shape of the moving fluid boundary and adjusting the relative distance between individual markers such that the distance remains within between 0.2 and 0.8 times the shortest distance between two points of the first plurality of points.

2. The method of claim 1 wherein the second plurality of points coincide with a subset of the first plurality of points.

3. The method of claim 1 wherein the curvature is evaluated at the second plurality of points in the non-fluid space and not in the fluid space.

4. The method of claim 1 wherein the second plurality of points forms a grid pattern.

5. The method of claim 1 wherein the single-phase fluid is bounded by a moving boundary and a fixed boundary.

6. The method of claim 5 further comprising:

forming a virtual moving boundary by extending the moving boundary from the fluid side of the fixed boundary to the non-fluid side of the fixed boundary;

evaluating a plurality of virtual signed distance function values on the non-fluid side of the fixed boundary relative to the virtual moving boundary; and wherein evaluating the curvature is based upon the signed distance function and the virtual signed distance function.

7. The method of claim 1, wherein the simulation space is discretized by a lattice of points.

8. A computer readable medium having computer executable program code for performing the method of claim 1.

9. A system for simulating single-phase fluid flow comprising:

a memory subsystem; and
a processor comprising:

circuitry configured to represent a position of a moving fluid boundary at a first point in time with a plurality of fluid markers, wherein the moving fluid boundary provides a boundary for the single-phase fluid, the moving fluid boundary separates a simulation space into a fluid space and a non-fluid space, and the single-phase fluid inhabits the fluid space;

circuitry configured to evaluate a plurality of signed distance function values at a first plurality of points surrounding the moving fluid boundary, based on the plurality of fluid markers;

circuitry configured to evaluate a plurality of curvature values of the moving fluid boundary based on the signed distance function at a second plurality of points near the fluid markers, wherein the second plurality of points do not coincide with the position of the moving fluid boundary;

circuitry configured to evaluate a plurality of velocity values at a third plurality of points in the fluid space of the single-phase fluid based upon the plurality of curvatures values; and circuitry configured to represent the position of the moving fluid boundary at a second point in time by updating the positions of the fluid markers based on the plurality of velocity values;

wherein after the plurality of fluid markers are updated at a second point in time the positions of the plurality of fluid markers are recalculated, while substantially maintaining the shape of the moving fluid boundary and adjusting the relative distance between individual markers such that the distance remains within between 0.2 and 0.8 times the shortest distance between two points of the first plurality of points.

* * * * *